United States Patent
Rengarajan et al.

(10) Patent No.: US 10,764,123 B2
(45) Date of Patent: Sep. 1, 2020

(54) NETWORK SWITCH CONFIGURATION

(71) Applicant: Hewlett Packard Enterprise Development LP, Houston, TX (US)

(72) Inventors: Madhusudanan Rengarajan, Bangalore (IN); Radhakrishnan Gopal, Bangalore (IN); Sivakumar Murugan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/047,462

(22) Filed: Jul. 27, 2018

(65) Prior Publication Data

US 2019/0036767 A1 Jan. 31, 2019

(30) Foreign Application Priority Data

Jul. 27, 2017 (IN) .............................. 201741026748

(51) Int. Cl.
*H04L 12/24* (2006.01)
*H04L 12/947* (2013.01)
(Continued)

(52) U.S. Cl.
CPC .............. *H04L 41/08* (2013.01); *G06F 9/445* (2013.01); *H04L 41/0806* (2013.01); *H04L 49/25* (2013.01); *H04L 49/65* (2013.01)

(58) Field of Classification Search
CPC ......... H04L 41/08; H04L 49/25; H04L 49/65; H04L 41/0806; H04L 41/085;
(Continued)

(56) References Cited

U.S. PATENT DOCUMENTS

| 7,219,339 B1* | 5/2007 | Goyal | H04L 41/085 |
| | | | 717/141 |
| 7,542,572 B2* | 6/2009 | Meier | H04L 41/0843 |
| | | | 380/277 |

(Continued)

OTHER PUBLICATIONS

Nortel Networks, "Overview-System Configuration," Nov. 30, 2007, pp. 1-344, NN47205-500 (322812-B), Version: 03.02.

(Continued)

*Primary Examiner* — Jung Liu
(74) *Attorney, Agent, or Firm* — Hewlett Packard Enterprise Patent Department

(57) ABSTRACT

Examples disclosed herein relate to configuring a network switch. In an example, user-defined configuration data may be included in a startup configuration file of a network switch. A token may be defined in the startup configuration file, wherein the token may represent a command for the network switch. The user-defined configuration data included prior to defining the token may be retained in the startup configuration file. In response to an event to restore factory-default configuration data in the network switch, an option may be provided to apply the user-defined configuration data included prior to the token along with the factory-default configuration data to the network switch. In response to selection of the option, the user-defined configuration data included prior to the token may be applied along with the factory-default configuration data to the network switch.

15 Claims, 3 Drawing Sheets

(51) Int. Cl.
*H04L 12/931* (2013.01)
*G06F 9/445* (2018.01)

(58) Field of Classification Search
CPC . H04L 41/0879; H04L 41/0213; H04L 41/22; G06F 9/445; G06F 8/427; G06F 8/30; G06F 9/45512
See application file for complete search history.

(56) References Cited

U.S. PATENT DOCUMENTS

| | | | | |
|---|---|---|---|---|
| 7,729,264 | B2* | 6/2010 | Valdes | H04L 12/42 370/241 |
| 2003/0048287 | A1* | 3/2003 | Little | G06F 9/45512 715/705 |
| 2003/0135508 | A1* | 7/2003 | Chorafakis | G06F 8/51 |
| 2004/0040016 | A1* | 2/2004 | Pearce | G06F 8/30 717/141 |
| 2004/0081104 | A1* | 4/2004 | Pan | G06F 9/4405 370/254 |
| 2005/0195660 | A1* | 9/2005 | Kavuri | G06F 3/0605 365/189.05 |
| 2006/0013217 | A1* | 1/2006 | Datla | H04L 41/0213 370/389 |
| 2006/0168322 | A1* | 7/2006 | Gray | H04L 41/082 709/238 |
| 2007/0140130 | A1* | 6/2007 | Valdes | H04L 12/42 370/241 |
| 2014/0298007 | A1* | 10/2014 | Rukmangathan | H04L 63/0876 713/153 |
| 2015/0113001 | A1* | 4/2015 | Prieto | H04L 41/0853 707/748 |
| 2016/0094483 | A1* | 3/2016 | Johnston | H04L 47/827 709/226 |

OTHER PUBLICATIONS

"Cisco MDS 9000 Family CLI Configuration Guide", Mar. 15, 2016, 9 pages.
"Using the CLI to implement configuration changes", Aug. 2015, 11 pages.

* cited by examiner

NETWORK SWITCH CONFIGURATION

BACKGROUND

A network switch is a networking device that connects devices together on a computer network by using packet switching to receive and forward data to the destination device. A network switch may use hardware addresses to process and forward data at the data link layer (layer 2) of the OSI model. Some switches can also process data at the network layer (layer 3) by additionally incorporating routing functionality to perform packet forwarding.

BRIEF DESCRIPTION OF THE DRAWINGS

The following detailed description references the drawings, wherein.

DETAILED DESCRIPTION

A network switch is typically programmed with a factory-default configuration during manufacturing with values set for each configuration parameter. The default configuration parameters of a network switch may be modified by a user. When a user commit changes to the configuration, a new configuration file may be created which may be used as the active configuration file.

There may be scenarios when a user may wish to apply a set of user-defined configuration features along with factory-default features of a network switch. An approach to retaining such user-defined features may include saving the set of features that are to be retained in a specific configuration file, which may be loaded on a switch with factory-default configuration. However, there are limitations related to this approach. For instance, user-defined features that are to be retained may have to be predetermined. Further, once the used-defined features are saved, any future additions, deletions, or modifications to the existing set may entail manual interventions, which could be time consuming. It may become further challenging if the running configuration file is large, and a user wishes to retain a specific set of features.

To address these technical challenges, the present disclosure describes various examples for configuring a network switch. In an example, a startup configuration file of a network switch may be edited to include user-defined configuration data in the startup configuration file. A token may be defined in the startup configuration file. The token may represent a command for the network switch to retain the user-defined configuration data in the startup configuration file. In response to an event to restore factory-default configuration data in the network switch, an option may be provided to apply the user-defined configuration data included prior to the token along with the factory-default configuration data to the network switch. In response to selection of the option, the user-defined configuration data included prior to the token may be applied along with the factory-default configuration data to the network switch.

Figure 1:
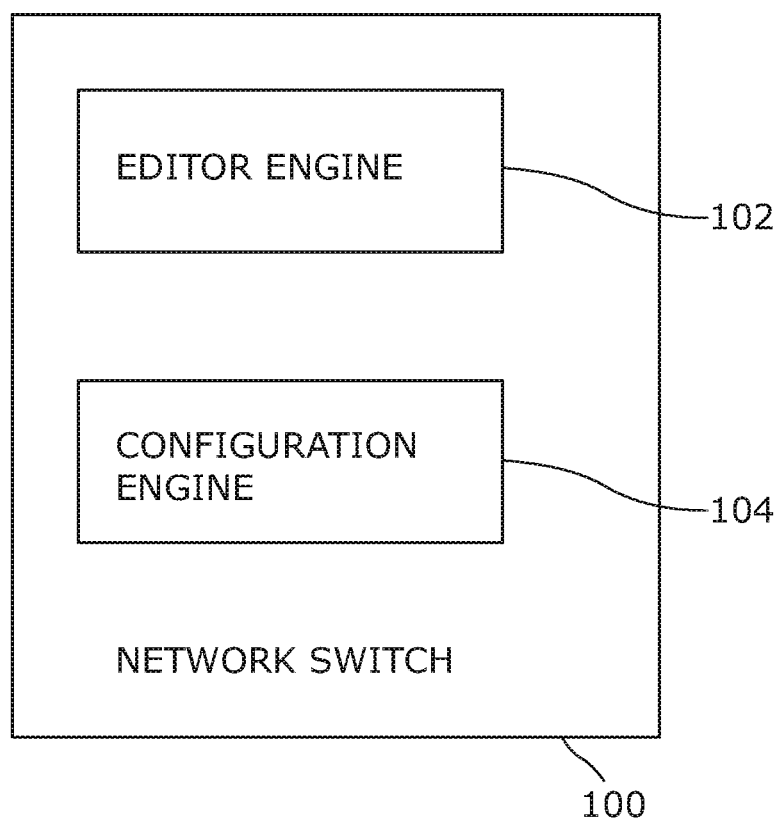
FIG. 1 illustrates a block diagram of an example network switch.

FIG. 1 illustrates a block diagram of an example network switch 100. Network switch 100 may include a networking device that connects devices together on a computer network by using packet switching to receive and forward data to a destination device. In an example, network switch 100 may use hardware addresses to process and forward data at the data link layer (layer 2) of the OSI model. In another example, network switch 100 may include a layer 3 switch. Network switch 100 may include a managed switch or an unmanaged switch. Network switch 100 may include a modular switch or a fixed configuration switch.

In an example, network switch 100 may include an editor engine 102 and a configuration engine 104. Engines 102 and 104 may be implemented by at least one computing device and may include at least engines 102 and 104 which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network switch 100. In some examples, the at least one machine-readable storage medium may store instructions that, when executed by the at least one processing resource, at least partially implement some or all engines of the computing device. In such examples, network switch 100 may include the at least one machine-readable storage medium storing the instructions and the at least one processing resource to execute the instructions.

In an example, editor engine 102 may be used to edit a startup configuration file of network switch 100. In an example, the startup configuration file may include factory-default configuration data or settings related to network switch 100. The factory-default configuration data may be included, for example, during switch manufacture in a factory. The configuration file may help in network switch 100 configuration.

In an example, network switch 100 may be managed through a direct console connection. In another example, network switch 100 may be managed through in-band (network) access. In the latter case, network switch 100 may be configured with an IP address and a subnet mask.

A terminal device (for example, a computing device, a mobile device, and a tablet) may be connected to network switch 100 and a console session may be started for editor engine 102 to edit a startup configuration file (for example, a default configuration file) of network switch 100. In an example, editor engine 102 may include a command line interface (CLI). The CLI may be a text-based command interface for configuring and monitoring network switch 100. The CLI may be accessed through the switch console, which may be accessed out-of-band by directly connecting the terminal device to network switch 100, or in-band by using, for example, Telnet from the terminal device.

In another example, editor engine 102 may include a web browser interface for editing a configuration file(s) of network switch 100. In a further example, editor engine 102 may include a menu-based interface for editing configuration data in a configuration file (for example, a startup configuration file) of network switch 100.

In an example, editing a startup configuration file of network switch 100 may include editing a running configuration file (for example, a running-config file). A running configuration file may exist in volatile memory and control network switch 100 operation. If no configuration changes are made since the switch was last booted, the running configuration file may be identical to the startup configuration file. The startup configuration file may exist in non-volatile memory and may be used to preserve the most recently-saved configuration as the "permanent" configuration.

In an example, editing a startup configuration file of network switch 100 by editor engine 102 may involve including user-defined configuration data in the startup configuration file. The factory-default configuration data in the startup configuration file may be modified by user as per his or her requirements. Some non-limiting examples of configuration features that may be modified may include: banners, manager and operator passwords, system parameters, IP addressing, time protocol, ports, trunk groups, a network monitoring port, Simple Network Management Protocol (SNMP) community names, IP authorized managers, and VLANs (Virtual LANs).

In an example, including user-defined configuration data in the startup configuration file may comprise, for example, defining a feature name which is to be modified, a parameter(s) related to the feature name, and/or a value for the parameter(s). Once the user-defined configuration data is included, a token may be defined in the startup configuration file to retain the user-defined configuration data in the startup configuration file. The term "token" may be defined as a sequence of characters having a collective meaning. In the present context, the token may include a programming element that represents a command for network switch 100 to retain the configuration data in the startup configuration file. The token may be used to signify that the user-defined configuration data preceding its usage is to be retained in the startup configuration file. In an example, the following commands may be provided via editor engine 102 to include user-defined configuration data in the startup configuration file. In the given example, a token "retain" prior to a carriage return may signify that the user-defined configuration data is to be retained in the startup configuration file. The token may be defined immediately following the user-defined configuration data. AS used herein, the term "carriage return" may refer to a control character or mechanism used to reset a device's position to the beginning of a line of text.

```
Switch (config) # [no] <feature-name> <tab>
<Parameter 1>
<Parameter 2>
<Retain>
<cr>
``` wherein:
"feature-name" represents the name of the switch configuration feature or data;
"Parameter 1" represents a first parameter related to the configuration feature;
"Parameter 2" represents a second parameter related to the configuration feature;
"Retain" represents a token; and
"cr" represents a carriage return.

To provide an example, a configuration feature "spanning tree", and its related parameters "config-revision", "instance", "mode", and "priority" may be included in the startup configuration file via the following example commands. As used herein, "spanning tree" may refer to a configuration related to the Spanning Tree Protocol (STP), which is a network protocol that builds a logical loop-free topology for Ethernet networks; "config-revision" may be used to set the MST region configuration revision number (default is 0); "instance" may be used to create, delete or configure an MST instance; "mode" may specify spanning-tree mode; and "priority" may be used to set the device STP priority (the value is in range of 0-61440 divided into steps of 4096 that are numbered from 0 to 15, default is step 8).

```
Switch (config) # spanning-tree <tab>
< config-revision >
< instance >
< mode >
< priority >
<Retain>
<cr>
```

To provide another example, a configuration feature "logging", and its associated parameters "control-descr", "oobm", "smm", "udp", "tcp", and "tls" may be included in the startup configuration file by using the following example commands. As used herein, "control-descr" may refer to a text string associated with a given IP-ADDR; "oobm" may be used to add an IP address to the list of receiving Syslog servers; "smm" may specify if the syslog server should receive log messages from a standby management module; "udp" may refer to using UDP as the transport protocol; "tcp" may refer to using TCP as the transport protocol; and "tls" may refer to using TLS as the transport protocol.

```
Switch (config) # logging 192.168.1.1 <tab>
<control-descr >
<oobm>
< smm >
<udp>
< tcp>
< tls>
<retain>
<cr>
```

To provide another example, a configuration feature "virtual switching framework (VSF)", and its associated parameters "disable", "domain", "lldp-mad", "member", "oobm-mad", "port-speed", and "sequenced-reboot" may be included in the startup configuration file by using the following example commands. As used herein, "disable" may refer to disabling VSF on the switch; "domain" may be used to assign a domain ID to the VSF virtual chassis; "lldp-mad" may be used to enable LLDP-MAD (Multi-Active Detection) on the VSF device; "member" may be used to configure a VSF virtual chassis member; "oobm-mad" may enable OOBM-MAD (Multi-Active Detection) on the VSF device; "port-speed" be used to configure the port speed for all VSF ports; and "sequenced-reboot" may be used to initiate a reboot of the VSF virtual chassis.

```
Switch (config) # vsf <TAB>
< disable >
< domain >
< lldp-mad >
< member >
< oobm-mad >
< port-speed >
< sequenced-reboot >
< retain >
<cr>
```

A token may be included after each configuration feature for the corresponding feature to be retained. In an example, if a user enables a token for a configuration feature, all of its child features may be retained as well.

In an example, once user-defined configuration data has been included in the startup configuration file, editor engine 102 may determine whether an event to restore factory-default configuration data in the network switch 100 has occurred. In an example, the event may include a command from a user via editor engine 102 (for example, a CLI command via a console command prompt). In an example, the command may include an "erase startup-config" command. The "erase startup-config" command may be used to replace the currently active startupconfig file (or a running-config file) with the factory-default startup configuration, and reboot network switch 100 from the currently active flash memory location. The erased startup-config file may be replaced with a new startup-config file. The new file may include the default configuration for network switch 100 in the memory location (primary or secondary) used for the reboot. For example, if the last reboot was from primary flash using a configuration file named "lastconfig". Executing erase startup-config may replace the current content of "lastconfig" with a default configuration and reboot network switch 100 from primary flash.

In response to a determination by editor engine 102 that an event to restore factory-default configuration data in network switch 100 has occurred, editor engine 102 may provide an option to a user to apply the user-defined configuration data along with factory-default configuration data to network switch 100.

In response to a selection of the option, configuration engine 104 may apply user-defined configuration data along with factory-default configuration data to network switch 100. On the other hand, in response to a non-selection of the option, configuration engine 104 may simply apply the factory-default configuration data to network switch 100. In the latter scenario, the user-defined configuration data that was included prior to the token may not be applied to network switch 100.

In an example, in response to the event to restore the factory-default configuration data in network switch 100, editor engine 102 may provide a second option to apply the factory-default configuration data to network switch 100. In response to selection of the second option, configuration engine may simply apply the factory-default configuration data to network switch 100.

In an example, editor engine 102 may allow a user to collectively view configuration features that are retained in the startup configuration file. In this regard, a command may be provided to editor engine 102 (for example, via a CLI). An example of such command may include "show configuration retain". Executing this command may collectively show a list of configuration features that are retained in the startup configuration file, as illustrated below.

```
Switch (config) # show running-config retain
<Feature 1 retain>
<Feature 2 retain>
|
<Feature N retain>
``` wherein:
"Feature 1 retain" may represent a feature name of first configuration feature retained in the configuration file;
"Feature 2 retain" may represent a feature name of second configuration feature retained in the configuration file; and
"Feature n retain" may represent a feature name of $n^{th}$ configuration feature retained in the configuration file.

To provide an example, a command to "show running configuration retain" on network switch 100 may show the following details.

```
Switch# show running configuration retain
spanning-tree
spanning-tree config-revision 20
spanning-tree instance 2 vlan 2 3
        spanning-tree mode rapid-pvst
        spanning-tree priority 10
    logging 192.168.1.1
        control-descr "syslog-server"
        smm
        tcp
vsf
enable domain 1234
member 1
type "J9850A" mac-address 40a8f0-9e2100
priority 128
link 11/A8
link 1 name "I-Link1_1"
exit
member 2
type "J9850A" mac-address a45d36-498400
priority 128
link 1 2/A6
link 1 name "I-Link2_1"
exit
oobm-mad
port-speed 10g
exit
```

Figure 2:
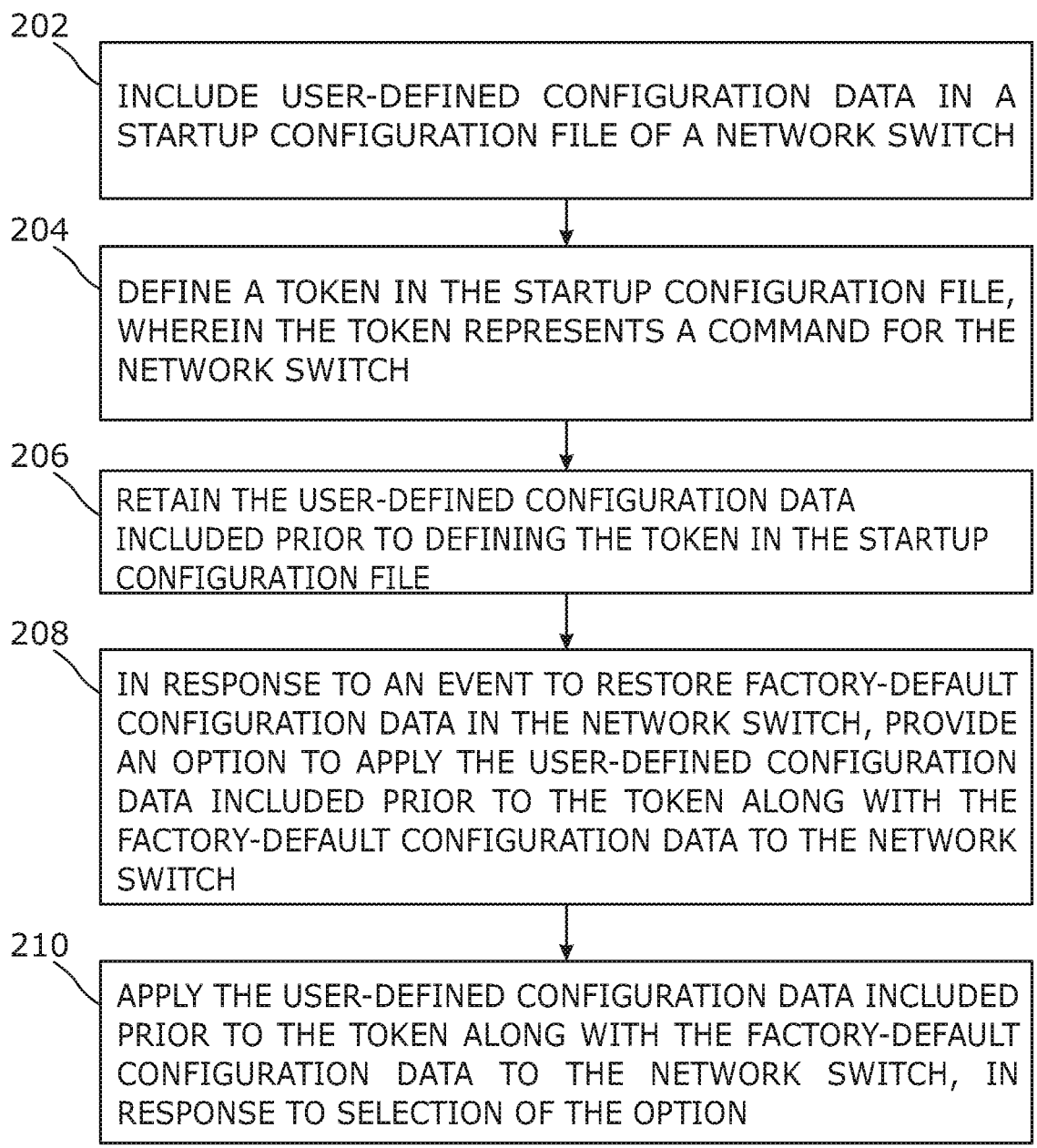
FIG. 2 is a flow chart of an example method of configuring a network switch.

FIG. 2 is a block diagram of an example method 200 for configuring a network switch 100. The method 200, which is described below, may be partially or fully executed on a network switch such as network switch 100 of FIG. 1. However, other network switches may execute method 200 as well. At block 202, a startup configuration file of a network switch (for example, 100) may be edited to include user-defined configuration data. At block 204, a token may be defined in the startup configuration file. The token may represent a command for the network switch. At block 206, the user-defined configuration data included prior to defining the token may be retained in the startup configuration file. At block 208, in response to an event to restore factory-default configuration data in the network switch, an option may be provided to apply, the user-defined configuration data included prior to the token along with the factory-default configuration data, to the network switch. At block 210, in response to selection of the option, the user-defined configuration data included prior to the token along with the factory-default configuration data may be applied to the network switch.

Figure 3:
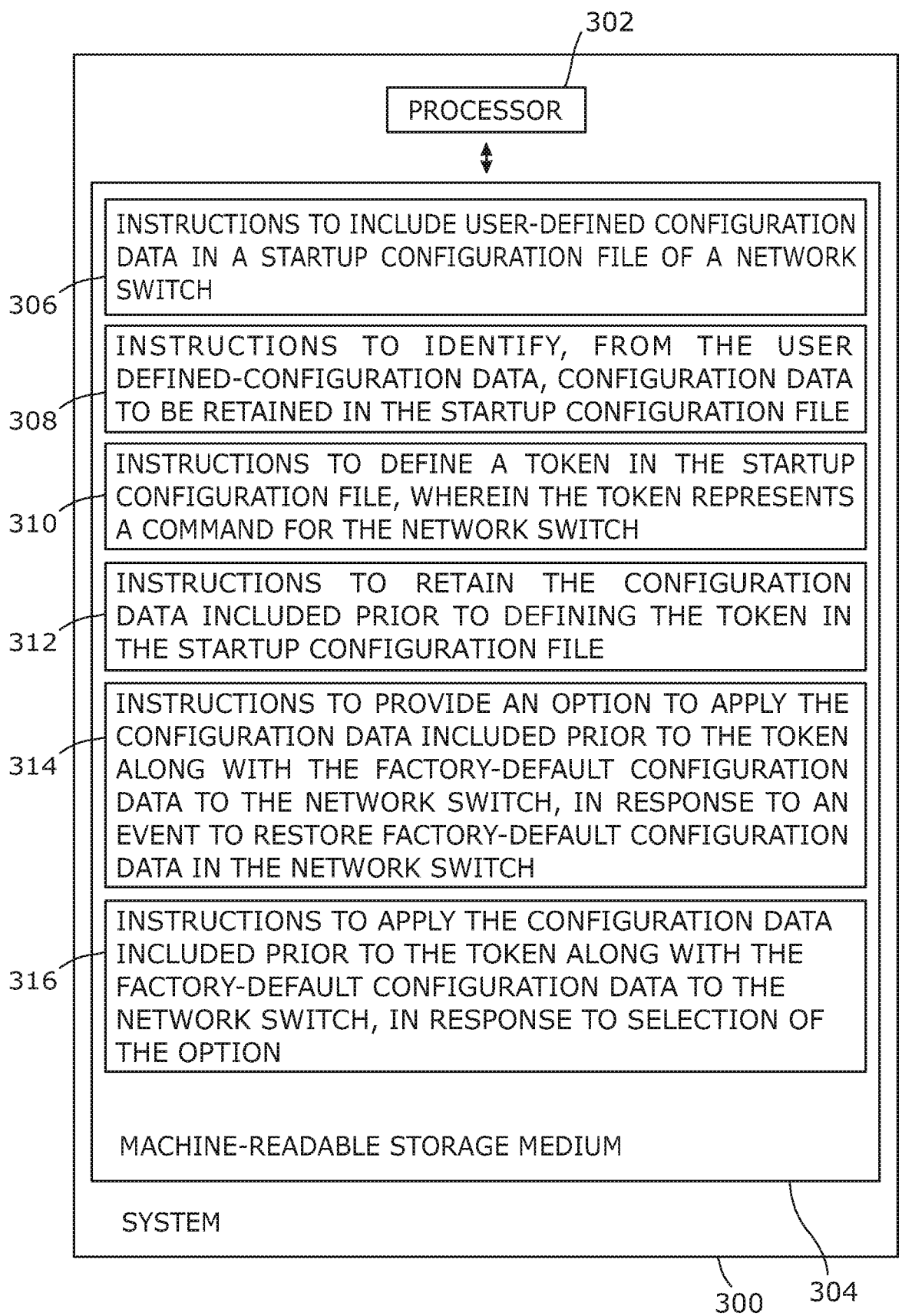
FIG. 3 is a block diagram of an example system including instructions in a machine-readable storage medium for configuring a network switch.

FIG. 3 is a block diagram of an example system 300 for configuring a network switch. System 300 includes a processor 302 and a machine-readable storage medium 304 communicatively coupled through a system bus. Processor 302 may be any type of Central Processing Unit (CPU), microprocessor, or processing logic that interprets and executes machine-readable instructions stored in machine-readable storage medium 304. Machine-readable storage medium 304 may be a random access memory (RAM) or another type of dynamic storage device that may store information and machine-readable instructions that may be executed by processor 302. For example, machine-readable storage medium 304 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 304 may store instructions 306, 308, 310, 312, 314, and 316. In an example, instructions 306 may be executed by processor 302 to edit a startup configuration file of a network switch to include user-defined configuration data in the startup configuration file. Instructions 308 may be executed by processor 302 to identify, from the user defined-configuration data, configuration data to be retained in the startup configuration file. Instructions 310 may be executed by processor 302 to define a token in the startup configuration file. The token may represent a command for the network switch to retain the configuration data in the startup configuration file. Instructions 312 may be executed by processor 302 to retain the configuration data included prior to defining the token in the startup configuration file. Instructions 314 may be executed by processor 302 to provide an option to apply the configuration data included prior to the token along with the factory-default configuration data to the network switch, in response to an event to restore factory-default configuration data in the network switch. Instructions 316 may be executed by processor 302 to apply the configuration data included prior to the token along with the factory-default configuration data to the network switch, in response to selection of the option.

For the purpose of simplicity of explanation, the example method of FIG. 2 is shown as executing serially, however it is to be understood and appreciated that the present and other examples are not limited by the illustrated order. The example systems of FIGS. 1 and 3, and method of FIG. 2 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the stages of any method or process so disclosed, may be combined in any combination, except combinations where at least some of such features and/or stages are mutually exclusive.

We claim:

1. A method comprising:
including user-defined configuration data in a startup configuration file of a network switch;
defining a token in the startup configuration file, wherein the token represents a command for the network switch and signifies that the user-defined configuration data is to be retained in the startup configuration file;
retaining the user-defined configuration data included prior to defining the token in the startup configuration file;
in response to an event to restore factory-default configuration data in the network switch, providing an option to apply the user-defined configuration data included prior to the token along with the factory-default configuration data to the network switch; and
applying the user-defined configuration data included prior to the token along with the factory-default configuration data to the network switch, in response to selection of the option.

2. The method of claim 1, further comprising:
applying the factory-default configuration data to the network switch, in response to non-selection of the option.

3. The method of claim 1, further comprising:
providing a second option to apply the factory-default configuration data to the network switch, in response to the event to restore the factory-default configuration data in the network switch; and
in response to selection of the second option to apply the factory-default configuration data to the network switch, applying the factory-default configuration data to the network switch.

4. The method of claim 3, wherein the event includes a command to erase the startup configuration file on the network switch.

5. The method of claim 1, wherein the startup configuration file includes a running configuration file on the network switch.

6. A network switch comprising:
an editor engine to:
include user-defined configuration data in a startup configuration file of a network switch;
define a token in the startup configuration file, wherein the token represents a command for the network switch and signifies that the user-defined configuration data is to be retained in the startup configuration file;
retain the user-defined configuration data included prior to defining the token in the startup configuration file; and
in response to a command to the network switch to erase the startup configuration file, provide an option to apply the user-defined configuration data included prior to the token along with the factory-default configuration data to the network switch; and
a configuration engine to:
apply the user-defined configuration data included prior to the token along with the factory-default configuration data to the network switch, in response to selection of the option; and
apply the factory-default configuration data to the network switch, in response to non-selection of the option.

7. The network switch of claim 6, wherein the user-defined configuration data includes a feature name, a parameter related to the feature name, and a value defined for the parameter.

8. The network switch of claim 6, wherein the editor engine is accessed via a device directly coupled to the network switch.

9. The network switch of claim 6, wherein the token is defined immediately following the user-defined configuration data.

10. The network switch of claim 6, wherein the editor engine is a command line interface (CLI).

11. A non-transitory machine-readable storage medium comprising instructions, the instructions executable by a processor to:
- include user-defined configuration data in a startup configuration file of a network switch;
- identify, from the user defined-configuration data, configuration data to be retained in the startup configuration file;
- define a token in the startup configuration file, wherein the token represents a command for the network switch and signifies that the user-defined configuration data is to be retained in the startup configuration file;
- retain the configuration data included prior to the token in the startup configuration file;
- provide an option to apply the configuration data included prior to defining the token along with the factory-default configuration data to the network switch, in response to an event to restore factory-default configuration data in the network switch; and
- apply the configuration data included prior to the token along with the factory-default configuration data to the network switch, in response to selection of the option.

12. The storage medium of claim 11, wherein the event includes a command to erase the startup configuration file on the network switch.

13. The storage medium of claim 12, wherein the command to erase the startup configuration file is received via a console command prompt.

14. The storage medium of claim 11, further comprising instructions to collectively display the configuration data in response to a user command.

15. The storage medium of claim 11, wherein the instructions to include comprise instructions to include the user-defined configuration data in the startup configuration file of the network switch via a menu-based interface.

* * * * *